United States Patent [19]

Impink, Jr. et al.

[11] Patent Number: 4,927,593

[45] Date of Patent: May 22, 1990

[54] BETA RAY FLUX MEASURING DEVICE

[75] Inventors: Albert J. Impink, Jr.; Norman P. Goldstein, both of Murrysville, Pa.

[73] Assignee: Westinghouse Electric Corp., Pittsburgh, Pa.

[21] Appl. No.: 275,983

[22] Filed: Nov. 25, 1988

[51] Int. Cl.$^5$ .............................................. G21C 17/00
[52] U.S. Cl. ..................................... 376/254; 376/153;
250/336.1; 250/370.04
[58] Field of Search ..................... 376/153, 254, 255;
250/370.04, 336.1, 390.01

[56] References Cited

U.S. PATENT DOCUMENTS 3,854,048 12/1974 Runge et al. ........................ 376/254

FOREIGN PATENT DOCUMENTS 0091029 10/1983 European Pat. Off. ....... 250/370.04
2920848 11/1979 Fed. Rep. of Germany ........................ 250/370.04
1454806 11/1976 United Kingdom ........... 250/370.04

*Primary Examiner*—Daniel Wasil
*Attorney, Agent, or Firm*—D. C. Abeles

[57] ABSTRACT

A beta ray flux measuring device in an activated member in-core instrumentation system for pressurized water reactors. The device includes collector rings positioned about an axis in the reactor's pressure boundary. Activated members such as hydroballs are positioned within respective ones of the collector rings. A response characteristic such as the current from or charge on a collector ring indicates the beta ray flux from the corresponding hydroball and is therefore a measure of the relative nuclear power level in the region of the reactor core corresponding to the specific exposed hydroball within the collector ring.

15 Claims, 3 Drawing Sheets

4,927,593

BETA RAY FLUX MEASURING DEVICE

This invention was made with government support under Government Contract No. SE-AC03-86SF16038. The government has certain rights in this invention.

BACKGROUND OF THE INVENTION

The present invention relates to a pressurized water nuclear reactor instrumentation system for determining the three-dimensional nuclear power distribution in the nuclear reactor core. More particularly, the present invention relates to a device for use with an in-core instrumentation system to measure the intensity of radiation induced in an activated movable member of the instrumentation system.

It is well known, that the three-dimensional nuclear power distribution within a reactor core can be inferred by employing an activation type incore instrumentation system. Such a system measures the intensity of radioactivity induced in an activated member such as long wires or columns of small balls. The long wire or balls such as hydroballs or aeroballs (i.e. an activated member) are introduced into the reactor core via tubes or instrumentation thimbles. The instrumentation thimbles extend for the length of fuel assemblies within the core. One such system is described in a co-pending U.S. patent application having U.S. Ser. No. 07/042,183, entitled Hydro-Ball In-Core Instrumentation System and Method of Operation which is assigned to the same assignee as this application. This copending application, U.S. Ser. No. 07/042,183, is hereby incorporated by reference (hereinafter "'183 application").

In the '183 application, a string of balls is introduced into the reactor core and positioned at sensing positions where they are irradiated. The irradiated balls are then retracted and the intensity of gamma rays emitted by the radioactive balls is measured. However, gamma rays have relatively long mean free paths, even in the most effective shielding materials. As a result, it is extremely difficult to measure the intensity of gamma ray radiation from an individual ball because the measurement is contaminated by gamma ray radiation from adjacent balls. This contamination or cross-talk blurs the measurement of gamma ray radiation intensity of each ball.

It is known that beta rays (i.e. energetic electrons emitted in nuclear decay) have much shorter mean free paths than do gamma rays (i.e. electro-magnetic radiation). Proper shielding of measurement apparatus is therefore more easily accomplished when detecting beta rays rather than gamma rays; reducing contamination (e.g., cross-talk or blurring) of measurements of emissions from an irradiated member such as a ball or wire. Kraftwerk Union AG of Mülheim on Ruhr in the Federal Republic of Germany has incorporated a beta ray detection device in a system that relies on irradiation of movable detectors (i.e. aeroballs) to measure power distributions in pressurized water nuclear reactors. However, in the Kraftwerk aeroball system, the instrumentation thimbles within the reactor vessel form part of the reactor coolant system pressure boundary, isolating the entire aeroball transport and counting system from the reactor coolant. The environment within the aeroball system is that of a gas, typically dry nitrogen, at approximately atmospheric pressure. In this environment use of a conventional beta ray counter, in which ionization of a gas by emitted beta particles is monitored, is feasible and provides a measure of the induced radioactivity of the irradiated aeroballs.

The hydroball system considered here cannot admit a conventional beta ray counter, as does the Kraftwerk system, since the environment within the hydroball system is a liquid at high pressure and so requires a pressure boundary that is too thick-walled for any emitted beta rays to penetrate through to an external beta ray counter. If the benefits of beta ray counting are to be realized in a hydroball system, the radioactivity measuring device must be capable of functioning in a liquid medium and must be installed inside the system pressure boundary.

SUMMARY OF THE INVENTION

It is an object of the present invention to provide a beta ray flux measuring device for an activation type incore instrumentation system.

It is another object of the present invention to provide a beta ray flux measuring device capable of detecting beta rays without violating a reactor pressure boundary.

It is a further object of the present invention to provide a self-powered beta ray flux measuring device.

It is still a further object of the present invention to provide a beta ray flux measuring device for an in-core hydroball instrumentation system that minimizes crosstalk in measurements of beta rays from individual hydroballs.

It is still another object of the present invention to provide a beta ray flux measuring device within the pressure boundary of a reactor vessel.

To achieve the above and other objects a beta ray flux measuring device system of the present invention measures a beta ray flux emitted from an activated member (e.g., a portion of a flux wire, an aeroball or a hydroball) and comprises a first conductor having an inner cavity for accepting the activated member, and conductor means, spaced from and positioned about the first conductor, for stopping all incident beta ray flux emitting by the activated member and for providing an indication of the stopped incident beta ray flux.

In a preferred embodiment of the present invention, a beta ray flux measuring device is connectable to a reactor vessel containing a reactor coolant at a pressure, and detects a beta ray flux emitted from respective positions of an activated member irradiated at corresponding sensing positions within the vessel. The beta ray flux measuring device comprises a pressure boundary defining an inner space with a central axis that is connectable to the reactor vessel so that the inner space contains some of the reactor coolant at substantially the same pressure as within the reactor vessel; an outer insulator positioned about the central axis and within the inner space; a collector ring having a response characteristic and being positioned within the inner space and about the central axis; and an inner conductor positioned about the central axis and within said collector ring so as to be electrically isolated from the collector ring.

The above and other objects and advantages of the present invention will be more apparent from the following description of the present invention taken in conjunction with the drawings wherein like reference numerals identify the same or similar elements.

DESCRIPTION OF THE PREFERRED EMBODIMENT

Figure 1:
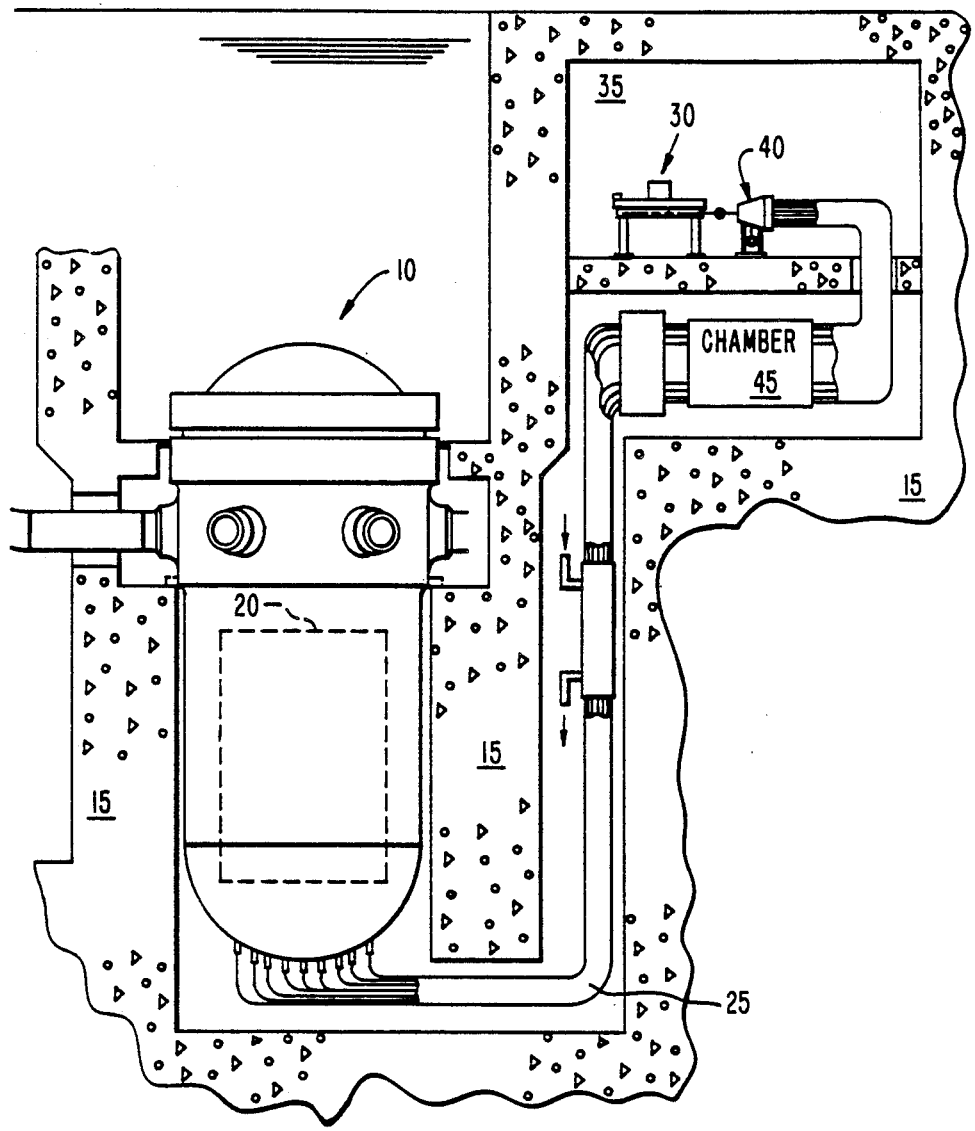
FIG. 1 is a schematic illustration of a reactor vessel and associated containment structure capable of use with the beta ray flux measuring device of the present invention.

FIG. 1 is a schematic illustration of a reactor vessel 10 and associated containment structure 15 capable of use with the beta ray flux measuring device of the present invention. As is well known, the reactor vessel 10 comprises a pressure boundary for containing pressures of, for example, 2250 psia, and contains a reactor coolant for cooling a reactor core 20. Tubes 25 are in communication with and comprise an extension of the pressure boundary of the reactor vessel 10.

In an in-core activation type measurement system, an activated member (e.g., an aeroball, a hydroball or flux wire) is transferred from sensing positions within the core 20 via the tubes 25 to a beta ray flux measuring device 30 within an instrumentation room 35. As shown in FIG. 1, there are a plurality of tubes 25 extending from the reactor vessel 10 to a transfer device 40. The transfer device 40 enables individual activated members to be brought into the beta ray flux measuring device 30. The individual activated members are stored within their respective tubes 25 in a chamber 45 before being selectively removed by the transfer device 40.

Figure 2:
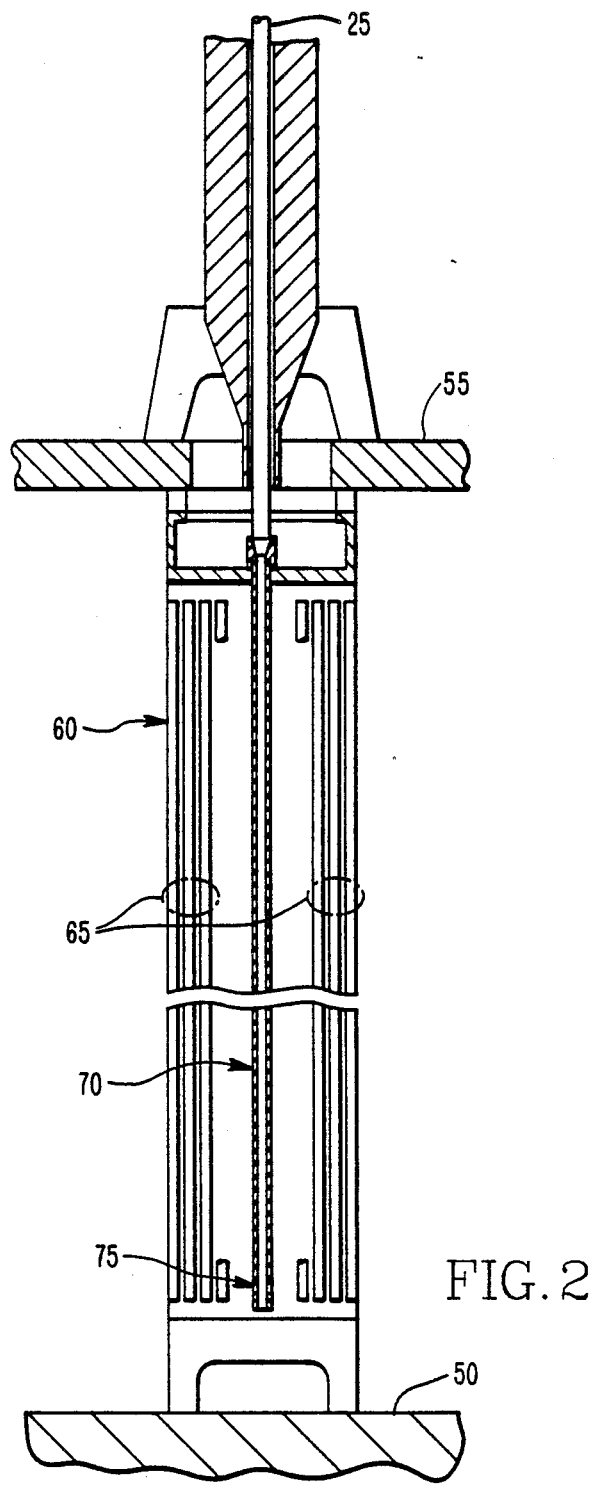
FIG. 2 is a fragmentary view of a fuel assembly and instrumentation thimble within the reactor system shown in FIG. 1.

FIG. 2 is a fragmentary view of a fuel assembly and instrumentation thimble within the reactor system shown in FIG. 1. In FIG. 2, reference numerals 50 and 55 respectively denote upper and lower core plates 20. As is well known, the core 20 houses a number of fuel assemblies 60. Each fuel assembly 60 includes a plurality of fuel rods 65. An instrumentation thimble 70 extends the length of the fuel assemblies 65. Holes 75 within the instrumentation thimble 70 permit the reactor coolant to flow within the instrumentation thimble 70. The instrumentation thimble path extends from the reactor vessel 10 via tubes 25 shown in FIG. 1. The tubes 25 are therefore extensions of the pressure boundary of the reactor vessel 10, and contain the reactant coolant at substantially the same pressure as within the reactor vessel 10.

Figure 3:
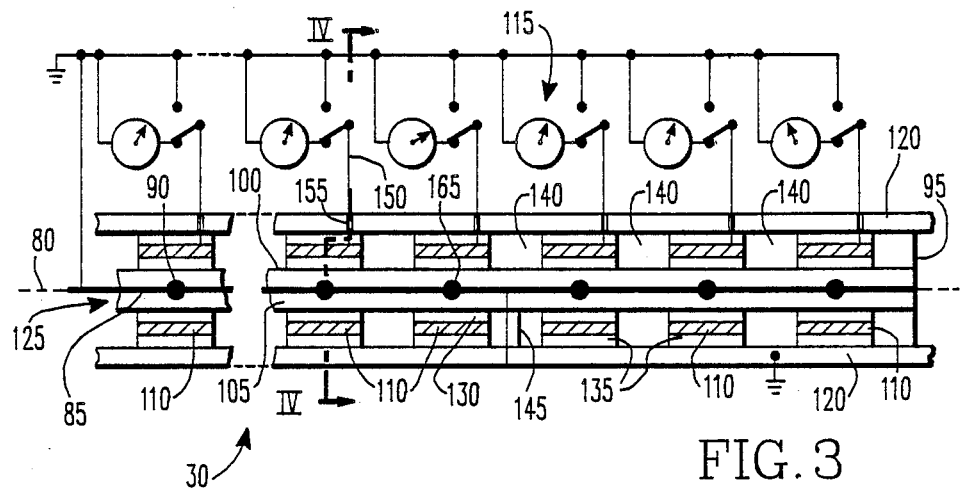
FIG. 3 is a schematic cross-sectional view of a beta ray flux measuring device system embodying the present invention.

FIG. 3 is a schematic cross-sectional view of a beta ray flux measuring device system embodying the present invention. The portion of the beta ray flux measuring device system 30 shown in FIG. 3 has a central axis 80. Positioned along the central axis 80 is an activated member 85. The activated member 85 can comprise a flux wire, a collection of aeroballs or a string of hydroballs or any other activated or irradiated member. The position of a string of hydroballs 90 within the beta ray flux measuring device system 30 is determined by stop 95.

A first conductor 100 defining an inner cavity 105 is positioned about the central axis 80 as shown in FIG. 3, the activated member 85 can be positioned within the cavity 105.

A conductor means 110 is spaced from and positioned about the first conductor 100. The conductor means 110 stops all incident beta ray flux emitted by the activated member 85 and provides an indication of the stopped incident beta ray flux. The indication can be, for example, a electric current or an electric charge, which can be measured and physically displayed by a measurement or display means 115. The measurement or display means 115 measures a response characteristic of the conductor means such as a flow of electrons or a stored charge induced by the beta rays emitted by the activated member 85; and more particularly by the hydroball 165. The measurement or display means 115 can comprise an electric meter such as a current meter or a voltage meter.

A pressure boundary 120 is positioned about the conductor means 110 so as to define a hermetically sealed inner space 125. The pressure boundary 120 is connectable to the reactor vessel 10 so that the inner space 125 contains some of the reactor coolant at substantially the same pressure as the coolant is under within the reactor vessel 10.

The conductor means 110 comprises a plurality of conductor rings 110 that are spaced from each other along the central axis 80. Each of the collector rings 110 is positioned to stop an incident beta ray flux from a respective portion of the activated member 85. Each collector ring 110 is insulated from the first conductor 100 by an inner insulator 130 which electrically isolates the collector rings 110 from the first conductor 100. Each collector ring 110 is electrically isolated from the pressure boundary 120 by an outer insulator 135 and is electrically isolated from an adjacent collector ring 110 by a spacer 140. At least one of the spacers 140 includes a conductive path 145 that electrically connects the first conductor 100 and the pressure boundary 120.

Figure 4:
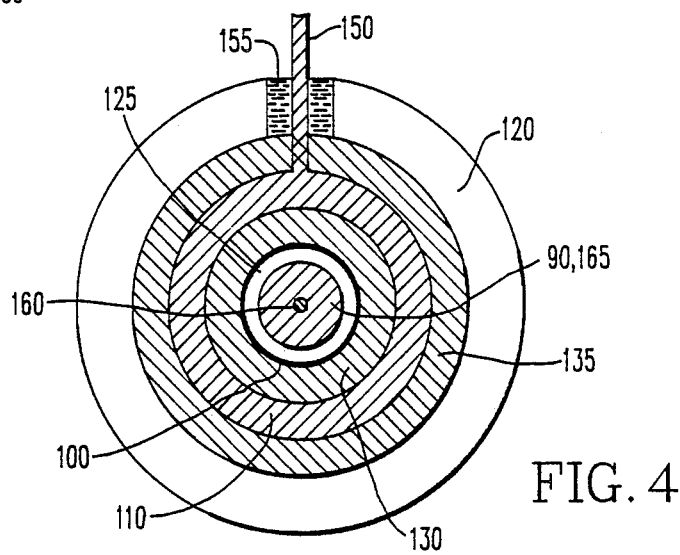
FIG. 4 is a cross-sectional view of one of the FIG. 3 detectors along the line 4—4.

FIG. 4 is a cross-sectional view of a FIG. 3 detector along the line 4—4. As seen in FIG. 4, a beta ray flux measuring device according to the present invention is entirely housed within the pressure boundary 120. Only a lead 150 extends out of the pressure boundary 120 through an isolating pressure seal 155. Reference numeral 160 identifies a hydroball carrier wire on which the respective hydroballs (e.g., 90, 165) are mounted.

Figure 5:
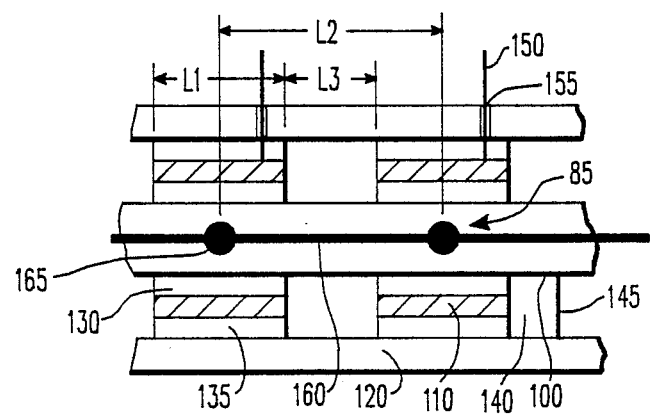
FIG. 5 is a more detailed illustration of a beta ray flux measuring device shown in the FIG. 3 beta ray flux measuring device system.

FIG. 5 is a more detailed illustration of a beta ray flux measuring device shown in the FIG. 3 beta ray flux measuring device system. In a preferred embodiment of the present invention, the length L1 of a collector ring 110 is, for example, 1.5 inches long. The length L1 of the collector ring 110 is selected so that no beta ray flux emitted by the associated hydroball 165 reaches an adjacent collector ring. In short, length L1 is much longer than the maximum range of the emitted betas. It will be appreciated that the collector ring 110 does not collect all of the emitted beta rays. Some betas are lost to the inner conductor 100 and the inner insulator 130; and some are emitted in a narrow cone around the central axis 80 and are stopped by the water and the wire 160 etc. The length L3 of the spacer 140 is selected to minimize the cross-talk between collector rings. In a preferred embodiment of the present invention, the length L3 is approximately 0.5 inch. The length L2, which corresponds to the center-to-center spacing between hydroballs 165, is approximately 2.0 inches.

With the above structure, the beta ray flux measuring device of the present invention functions as a self powered beta ray detector. Beta rays emitted from the activated member 85 pass through the first conductor 100, the inner insulator 130 and are collected by the collector ring 110. A charge therefore builds up on the collector ring 110. A measurement or display means 115 can measure this response characteristic of the collector ring 110; that is, measure a current or voltage. The measured response characteristic such as charge or current provides an indication of the intensity of beta ray emissions from the activated member 85. Because each collector ring 110 is electrically isolated by way of spacers 140 and because the collector ring length L1 is selected to collect as many as practical of the beta rays emitted by the hydroball 165, the beta ray detector of the present invention minimizes contamination or crosstalk in the measurements of the beta rays emitted from individual hydroballs 165.

In a preferred embodiment of the present invention, the hydroball 165 comprises a stainless steel ball including approximately 2-to-8 percent manganese. The diameter of the hydroball 165 is approximately 0.188 inches and, as noted above, the spacing between adjacent hydroballs 165 is approximately 2.0 inches.

It is known that the activation process for a hydroball having the above composition is $^{55}$Mn(n,$\gamma$) $^{56}$Mn. The 2200 mps activation cross section is 13 barns and the resonance integral is 14 barns. The decay process for an activated hydroball 165 having the above composition is

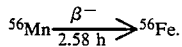

The total transition energy for this process is 3.70 Mev, with three major beta transitions. The maximum energy for each transition group is 2.84, 1.03 and 0.72 Mev. Beta rays with these maximum energies are emitted in 47 percent, 34 percent, and 18 percent of the transitions, respectively.

Because it is desired to have the collector ring 110 collect as many as practical of the beta rays emitted from hydroball 165, it is desirable to have the first conductor 100 and inner insulator 130 as thin as possible. To select the appropriate dimensions for the first conductor 100 and inner insulator 130, the transmission and attenuation characteristics of electrons with a beta spectrum must be determined for various materials comprising these members. The transmission and attenuation characteristic can be approximately described in terms of an exponential loss of transmitted electrons with increasing material thickness. For example, if the thickness of a material is x and $N_0$ is the number of beta rays (i.e., energetic electrons) incident to a surface of the material, then the number of electrons or beta rays emerging from an opposite surface of the material can be described by $$N(x) = N_o\, e^{-(\rho x)(\mu/x)}$$

In the above equation, ($\rho x$) is the thickness of the material in gm/cm$^2$, and ($\mu/x$) is the co-efficient describing the attenuation of the incident beta rays in units of cm$^2$/gm. This co-efficient strongly depends on the maximum energy of the beta ray spectrum, but is not strongly dependent upon the material, as long as the units of gm/cm$^2$ for thickness and cm$^2$/gm for attenuation co-efficients are used. The co-efficients for the two major beta ray groups can be found in G. Krop et al. *In $\alpha$ -, $\beta$ - and $\gamma$ - ray Spectroscopy*, North Holland Publishing Co., Amsterdam 1965, Chapter 1, page 23. The co-efficients for the two major beta energy groups noted above are 3.9 cm$^2$/gm for the 2.84 Mev energy group, and 16.5 cm$^2$/gm for the 1.03 Mev energy group. Based on the above, the following table is derived.

TABLE 1

Fractional Transmission of Beta Rays in Various Intervening Materials (2.84 Mev $E_{Max}$ Beta Spectrum)

| Transmission Material | Thickness | Transmission Factor |
|---|---|---|
| Zircaloy Grounding Tube | .012" = .196 gm/cm$^2$ | .46 |
| Polyethylene Sleeve | .030" = .076 gm/cm$^2$ | .74 |

Referring to FIG. 4, in a preferred embodiment of the present invention, the hydroball carrier wire 160 has an outside diameter of approximately system 30 mil. The hydroball 165 has an outside diameter of approximately 188 mil, and the space between the hydroball 90 and the first conductor 100 is approximately 13 mil. The first conductor 100 has a thickness of, for example, 12 mil and can comprise zircaloy or nickel. The inner insulator 130 has a thickness of approximately of 30 mil and preferably comprises polyethylene. The inner insulator 130 can also comprises teflon which has superior electrical insulation characteristics and therefore could be thinner than the polyethlyene insulator and would afford better transmission characteristics. Teflon, however, mechanically degrades with exposure to radiation. The collector ring 110 has a thickness of approximately 60 mil and can comprise a composition of stainless steel as noted above or a similar composition of nickel. The outer insulator 135 has a thickness, for example, 30 mil and can comprise teflon.

With the above dimensions, and with reference to the above table, a 30 mils polyethylene inner insulator 130 will attenuate the 2.84 Mev beta ray flux by an additional 25 percent. The thickness of the collector ring 110 need only be thick enough to stop all incident beta ray. A thickness of 60 mils of nickel or equivalent metal is sufficient. A 12 mils zircaloy first conductor 100 will attenuate the 2.84 Mev beta ray flux emitted from an activated member 85 by approximately 50 percent. The first conductor 100 does not need to be electrically continuous over its entire length or entire circumference. For example, it is only necessary that the first conductor 100 electrically ground the hydroball string 90. Because the hydroball string 90 is electrically conductive, it is only necessary to provide only a few points of good contact between the string 90 (e.g. by way of a hydroball 165) and the first conductor 100. Accordingly, a mesh-like grounding conductor would serve as well as a solid tube and would yield a significantly higher transmission factor and a stronger measurable signal.

While the beta ray flux measuring device of the present invention detects the intensity of beta rays emitted by the activated member 85, the activated member 85 will also emit gamma rays. These gamma rays will also produce the so called "self-powered" currents in the collector ring 110. However, the gamma ray induced current is expected to be small for two reasons. First, the gamma interaction probability in one compton electron range of an electrode surface (i.e., so the electrons can escape) is just a few percent. Gamma rays have much longer mean free paths than do beta rays. The only way that electrons can be lost from the collector ring 110 is by a so called Compton scattering collision of a gamma ray in the collector ring 110 (which results in a moderately energetic free electron and a degraded gamma ray) close enough to the surface of the collector ring 110 that the electron, if it is scattered in the right direction, can escape the collector ring 110 before it looses all its imparted energy. This layer on the surface of the collector ring 110 from which Compton electrons can escape is thin enough that the likelihood of a gamma interaction within this layer, granted the long mean free paths of gamms, is quite small. Hence, the electron loss rate from the collector ring 110 can be neglected.

Second, the current will have two opposite components, one from the grounding tube out to the collector ring, and one from the collector ring out to the pressure boundary. These two opposite current components will approximately cancel each other. The current of electrons driven from the inner conductor and insulator toward the collector ring 110 by gamma interactions within the inner conductor 100 and inner insulation 130 tends to balance the small gamma induced current of electrons driven from the collector ring 110. The beta rays that are trapped in the inner conductor 100 are conducted away since the inner conductor 100 is grounded. Also all beta rays trapped in the balls 165 themselves are conducted away since the hydroballs 165 are also grounded. There is, therefore, no charge buildup. Beta rays trapped in the insulators (e.g. 130, 135) will gradually leak away and will yield only very small currents because the insulators comprise insulating material.

Referring to FIG. 3, in a preferred embodiment of the present invention, a beta ray flux measuring device system would have a number of collector rings 110 corresponding to the number of hydroballs 165 on the hydroball string 90. The centers of adjacent collector rings 110 are spaced the same distance apart as are the hydroballs on the hydroball string 90. With the lengths discussed in respect to FIG. 5, placement of a hydroball with respect to the center of a collector ring 110 is not extremely critical. For example, if a hydroball 165 was displaced by, for example, 0.25 inch from the middle of the collector ring 110, the beta ray flux detected would not vary appreciably. This is because the length of the collector ring 110 is substantially greater than the diameter of the hydroball 165. Consequently, almost all of the beta rays would still be stopped by the collector ring 110. While FIG. 3 illustrates a separate measurement or display means 115 for each collector ring 110, a single measurement/display means could be multiplexed to each of the collector rings 110. Alternatively, all of the collector rings could be wired together and the current or voltage of the respective conductor means/collector rings 110 would then, by sequentially opening and closing of the connecting switches, be measured sequentially by a single meter.

To calibrate a system such as illustrated in FIG. 3, an activated calibration member having a sufficiently long half life and similar beta decay characteristics is irradiated in the reactor core 20 and then passed through the individual collector rings 110. The response characteristic (i.e. the induced current or voltage) is measured as the activated calibration member passes each collector ring 110. For example, if Praseodymium-142 which has a half life of 19.2 hours and a maximum beta decay energy of 2.16 Mev is used, a beta ray flux measuring device embodying the present invention can be easily calibrated. Only a small correction for the decay of the activated calibration member would be needed as the respective beta ray flux measuring devices are calibrated.

It is estimated that each collector ring 110 would generate an electric current in the range of 20 to 200 picoamperes. Because the system can be calibrated as noted above, the measurement of the response characteristic, such as current, at each collector ring need not be highly accurate. The measurements, however, must be precise. The present invention eliminates the need for calculating the response characteristic (e.g., the actual current or charge) that will be induced in a collector ring 110 for a given beta ray flux. Instead, as discussed above, a measurable beta ray flux from an activated hydroball 165 is placed in the measuring device of the present invention, and the corresponding response characteristic measured. Because the response characteristic is known with respect to a given beta ray flux, no further calibration is needed and the detector device is ready for use.

We claim:
1. A beta ray flux measuring device system for detecting a beta ray flux emitted by an activated member, comprising:
   a first conductor having an inner cavity for accepting the activated member;
   collector means, spaced from and positioned around said first conductor, for collecting an incident beta ray flux emitted by the activated member and for providing an indication of the collected incident beta ray flux; and
   a pressure boundary spaced from and positioned around said collector means so as to hermetically seal said collector means.

2. A beta ray flux measuring device system according to claim 1, wherein said collector means has a central axis and comprises:
   a plurality of collector rings spaced from each other along the central axis, each collector ring positioned so as to collect an incident beta ray flux from a respective portion of the activated member.

3. A beta ray flux measuring device system according to claim 2, further comprising:
   a plurality of inner insulators respectively positioned between corresponding ones of said collector rings and said first conductor so as to electrically isolate said collector rings from said first conductor;
   a plurality of outer insulators respectively positioned between corresponding ones of said collector rings and said pressure boundary so as to electrically isolate said collector rings from said pressure boundary; and
   a plurality of spacers positioned around said first conductor and being respectively positioned between corresponding ones of said collector rings so as to electrically isolate said collector rings from each other, at least one of said spacers including a conductive path positioned to electrically connect said first conductor and said pressure boundary.

4. A beta ray flux measuring device system according to claim 2, further comprising:
   display means for physically displaying said indication provided by said collector means.

5. A beta ray flux measuring device system according to claim 4, wherein said display means comprises an electric meter operatively connected to said collector means.

6. A beta ray flux measuring device system according to claim 1, further comprising:
   display means for physically displaying said indication provided by said collector means.

7. A beta ray flux measuring device system according to claim 5, wherein said display means comprises an electric meter operatively connected to said collector means.

8. A beta ray flux measuring device connectable to a reactor vessel containing a reactor coolant at a pressure, for detecting a beta ray flux emitted from respective portions of an activated member irradiated at corresponding sensing positions within the vessel, said detector comprising:
   a pressure boundary defining an inner space with a central axis and being connectable to the reactor vessel so that the inner space contains some of the reactor coolant at substantially the pressure;
   an outer insulator positioned around the central axis within the inner space;
   a collector ring having a response characteristic and being positioned within the inner space and around the central axis; and
   an inner conductor positioned around the central axis and within said collector ring so as to be electrically isolated from said collector ring.

9. A beta ray flux measuring device according to claim 8, further comprising:
   an inner insulator positioned between said inner conductor and said collector ring.

10. A beta ray flux measuring device according to claim 9, further comprising:
    an additional collector ring having a response characteristic and being positioned within the inner space and around the central axis and said inner conductor, said additional collector ring being electrically isolated from said collector ring and said inner conductor.

11. A beta ray flux measuring device according to claim 10, further comprising:
    a spacer positioned between and electrically isolating said collector ring from said additional collector ring.

12. A beta ray flux measuring device according to claim 11, further comprising:
    a conductive path electrically connecting said pressure boundary and said inner conductor.

13. A beta ray flux measuring device according to claim 12, further comprising:
    measurement means for measuring the response characteristics of said collector ring and said additional collector ring.

14. A beta ray flux measuring device according to claim 13, wherein said measurement means comprises a current meter.

15. A beta ray flux measuring device according to claim 13, wherein said measurement means comprises a voltage meter.

* * * * *